United States Patent
Sterner

(10) Patent No.: US 7,431,560 B2
(45) Date of Patent: Oct. 7, 2008

(54) TURBINE HOUSING OF AN EXHAUST GAS TURBOCHARGER WITH ADJUSTABLE TURBINE GEOMETRY

(75) Inventor: Andreas Sterner, Moeglingen (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 389 days.

(21) Appl. No.: 11/368,428

(22) Filed: Mar. 7, 2006

(65) Prior Publication Data

US 2006/0204362 A1  Sep. 14, 2006

(30) Foreign Application Priority Data

Mar. 8, 2005  (DE) .................. 10 2005 010 500
Mar. 16, 2005  (DE) .................. 10 2005 012 048

(51) Int. Cl.
*F04D 29/56* (2006.01)

(52) U.S. Cl. .................. 415/164; 415/191; 415/160

(58) Field of Classification Search .................. 415/158, 415/160, 162, 161, 163, 165, 191, 147
See application file for complete search history.

(56) References Cited

U.S. PATENT DOCUMENTS

| | | | |
|---|---|---|---|
| 6,055,288 A | 4/2000 | Schwirian | |
| 6,164,886 A | 12/2000 | Matarazzo et al. | |
| 7,189,058 B2 * | 3/2007 | Metz et al. | .................. 415/165 |
| 7,322,791 B2 * | 1/2008 | Stilgenbauer | .................. 415/164 |

FOREIGN PATENT DOCUMENTS

| | | |
|---|---|---|
| DE | 103 12 324 B3 | 6/2004 |
| EP | 0 480 911 A2 | 4/1992 |
| EP | 1 236 866 A2 | 9/2002 |
| EP | 1 394 364 A1 | 3/2004 |
| EP | 1 528 225 A1 | 5/2005 |
| WO | WO 2004/027218 A1 | 4/2004 |

OTHER PUBLICATIONS

European Search Report dated Apr. 19, 2006 (Seven (7) pages); including English translation of partinent portion (One (1) page).

* cited by examiner

*Primary Examiner*—Edward Look
*Assistant Examiner*—Dwayne J White
(74) *Attorney, Agent, or Firm*—Crowell & Moring LLP

(57) ABSTRACT

A turbine housing of an exhaust gas turbocharger having an adjustable turbine geometry is provided having a carrier ring on which are mounted adjustable guide vanes for regulating the boost pressure and having a cover ring for the guide vanes, whereby the carrier ring and cover ring are spaced a distance apart by means of spacer elements to form a guide vane gap. A fastening screw passes through each spacer element, and screwed into the carrier ring and/or cover ring. Receiving openings for the head of the fastening screw are provided in the carrier ring or cover ring. At least one securing recess is provided in the carrier ring and/or cover ring on the outside circumference of the receiving opening, said securing recess being provided to accommodate material of the screw head to establish a form-fitting connection.

11 Claims, 3 Drawing Sheets

TURBINE HOUSING OF AN EXHAUST GAS TURBOCHARGER WITH ADJUSTABLE TURBINE GEOMETRY

This application claims the priority of German application No. 10 2005 010 500.9, filed Mar. 8, 2005 and German application No. 10 2005 012 048.2, filed Mar. 16, 2005, the disclosure of which are expressly incorporated by reference herein.

BACKGROUND AND SUMMARY OF THE INVENTION

The present invention relates to a turbine housing for an exhaust gas turbocharger with an adjustable turbine geometry.

Exhaust gas turbochargers in which the boost pressure can be regulated by adjustable guide vanes are known from German Patent DE 103 12 324 B3, for example. A guide vane apparatus, consisting of a carrier ring for the guide vanes and a cover ring which is opposite the carrier ring, is mounted in the turbine housing of such chargers having a variable turbine geometry (VTG), maintaining a guide vane gap distance. Spacer elements, e.g., in the form of spacer sleeves held by fastening screws, for example, are distributed radially around the circumference of the two rings to maintain a distance from the carrier ring and the cover ring. When using these VTG chargers in gasoline engines in particular, these components are exposed to high exhaust gas temperatures. A durable screw connection of the spacers is especially critical here. If the spacer elements are exposed to the hot exhaust gas flow, they will expand accordingly in the longitudinal direction while the fastening screws are still relatively cold. Conversely, when there is a subsequent jump in load (full load in the direction of low partial load), the spacer element is first cooled by the exhaust gas stream while the fastening screw is still relatively hot. This results in more rapid shrinkage of the spacer element over time in comparison with the fastening screw and thus results in a corresponding loss of prestress power. Due to the loss of prestress power, the fastening screw must now absorb all the transverse forces occurring due to engine operation, which under some circumstances will result in component failure of the fastening screw.

An object of the present invention is to overcome the disadvantages described above in order to ensure safe, reliable, continuous operation of the VTG charger.

A durable screw connection without any loss of prestress power is ensured by an additional form-fitting connection between the fastening screw and the carrier ring or cover ring. For the form-fitting connection, securing recesses are provided in the carrier ring or cover ring in the area of the receiving opening for the head of the fastening screw so that, for example, material of the screw head can be introduced into the securing recesses by caulking by a reshaping operation.

Additional advantageous embodiments and refinements of the turbine housing and/or the guide vane apparatus for a VTG turbocharger are possible through the features characterized in the subclaims.

For example, two securing recesses to receive the screw head material are preferably provided per screw connection, each securing recess being offset 180° on the outside circumference of the recess opening for the screw head. This establishes an optimum form-fitting connection which prevents a loss of prestress power and thus prevents the fastening screw from becoming unscrewed.

The securing recesses may be created mechanically, e.g., by a suitable milling tool, or as an alternative they may be created already in the casting operation, e.g., by the MIM (metal injection molding) method or by the precision casting method to produce the carrier ring or the cover ring.

A good frictionally engaged screw connection of the guide vane apparatus is ensured by using a fastening screw with a countersunk head.

Three receiving openings for the fastening screws are distributed uniformly around the circumference in the carrier ring or cover ring.

Other objects, advantages and novel features of the present invention will become apparent from the following detailed description of the invention when considered in conjunction with the accompanying drawings for example.

DETAILED DESCRIPTION

Figure 1:
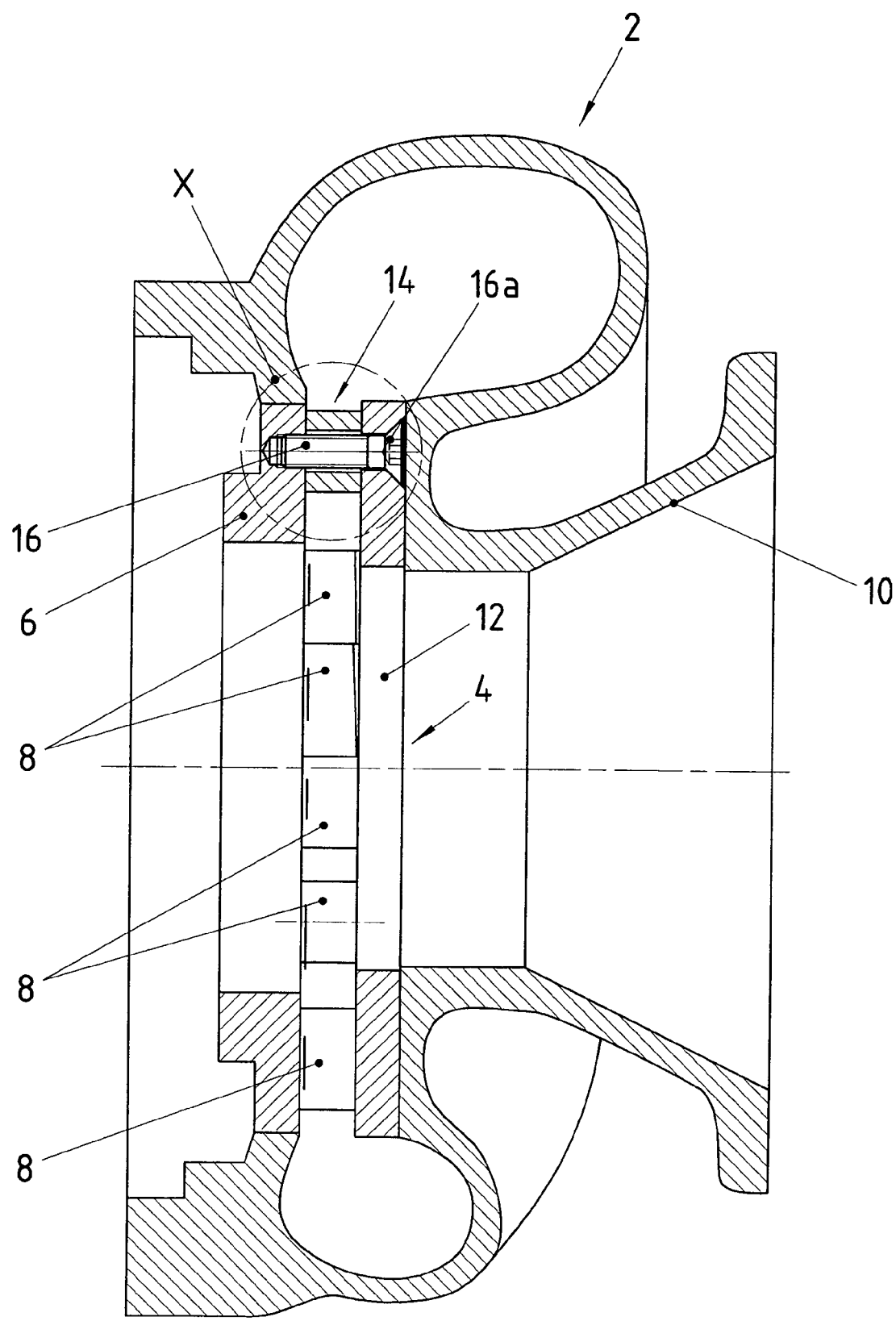
FIG. 1 shows a cross section through a turbine housing of an exhaust gas turbocharger in accordance with an embodiment of the present invention.
Figure 2:
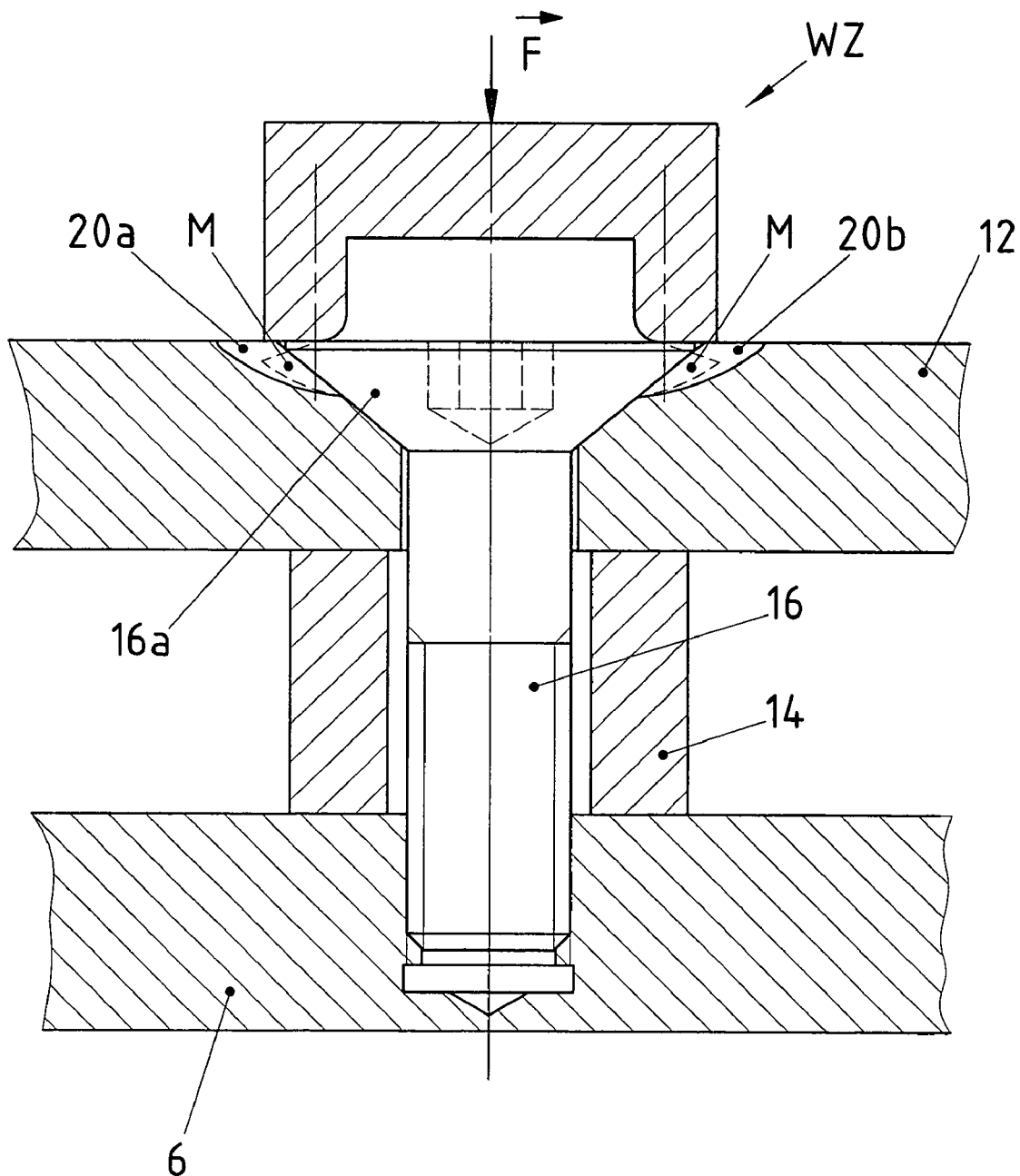
FIG. 2 shows an enlarged detail X according to FIG. 1.

Referring to FIG. 1, a guide vane apparatus 4 is provided in the turbine housing 2 of a so-called VTG exhaust gas turbocharger. The guide vane apparatus 4 consists of a carrier ring 6 on which adjustable guide vanes 8 are mounted for regulating the boost pressure. The guide vanes 8 are bordered by a cover ring 12 on their end face assigned to the exhaust gas outlet 10. The axial guide vane gap is defined with the help of spacer elements, designed as spacer sleeves 14 in the present case, distributed radially on the circumference of the carrier ring 6 and the cover ring 12. The spacer sleeves 14 are secured with the help of fastening screws 16.

In the present exemplary embodiment, three spacer sleeves 14 and/or fastening screws 16 distributed uniformly on the circumference (3×120°) are provided on a common partial circle TK.

Figure 3:
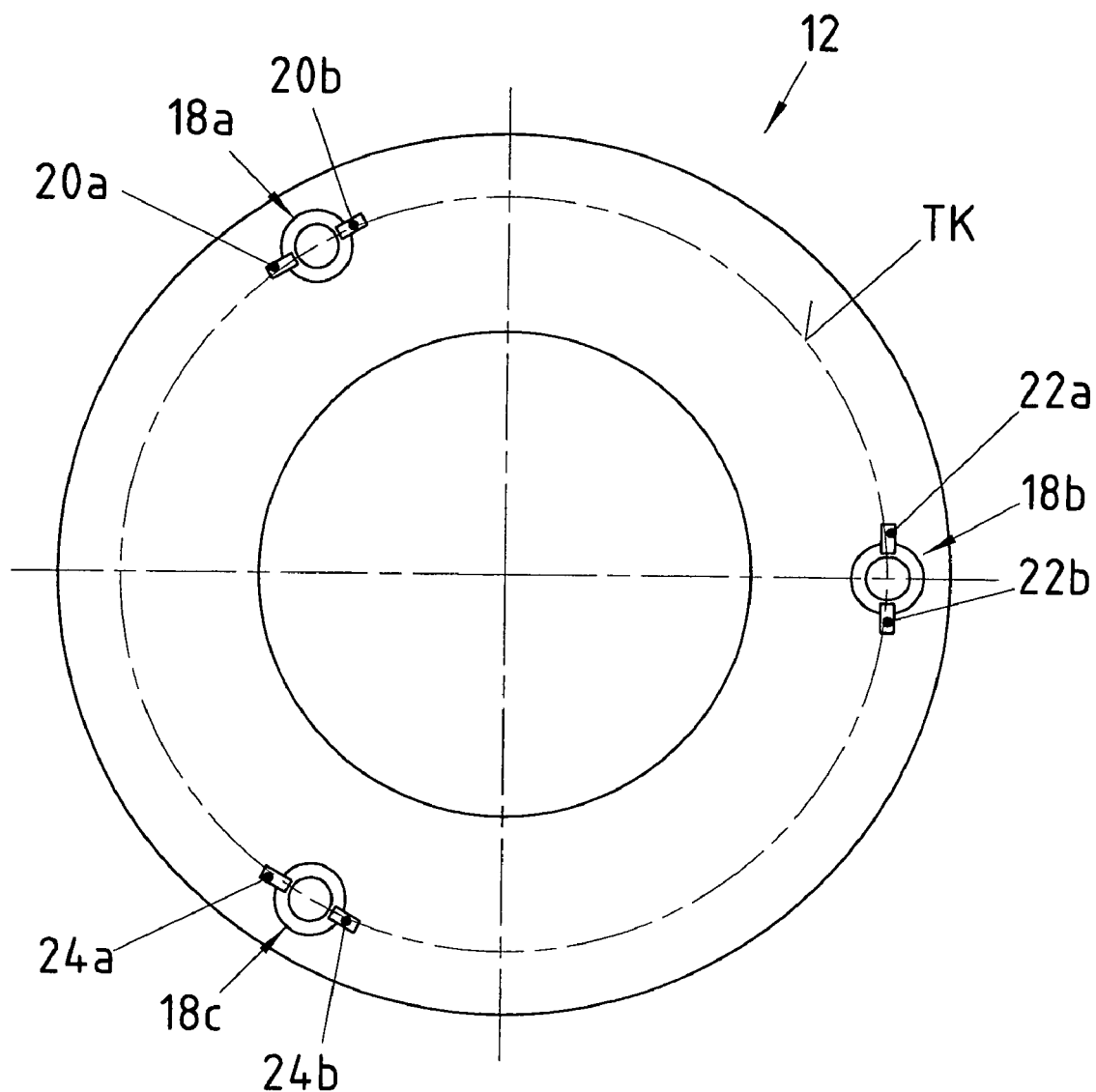
FIG. 3 shows a top view of a cover of a guide vane apparatus of the turbine housing (without screw connection) in accordance with another embodiment of the present invention.

The screw head 16a of the fastening screws 16 is designed as a countersunk head, so that the conically tapering screw head 16a is countersunk in a corresponding receiving opening 18a through 18c provided in the cover ring 12 (see FIG. 3). In the outside circumference of each receiving hole 18a through 18c, slot-shaped securing recesses 20a, 20b; 22a, 22b and 24a, 24b are arranged on the outside circumference with a mutual 180° offset; material of the screw head 16a is introduced into these securing recesses as explained below.

The securing recesses 20a, 20b; 22a, 22b and 24a, 24b may be produced mechanically, e.g., by an end mill cutter or disk miller or alternatively they may be produced in the casting operation for manufacturing the cover disk 12, e.g., by the MIM (metal injection molding) method or by the precision casting method.

After the carrier ring 6 for the guide vanes 8 has been bolted to the cover ring 12, creating a corresponding tightening torque, material M of the screw head 16a is forced into the securing recesses 20a, 20b; 22a, 22b and 24a, 24b with the help of a staking tool WZ and thus a partial form-fitting connection between the screw head 16a and the cover ring 12 is established in addition to the frictionally engaged connection.

The number and geometric design of the securing recesses 20a, 20b; 22a, 22b and 24a, 24b may of course also be varied for the concrete application and depend on the size and performance of the exhaust gas turbocharger and/or the engine and the height of the exhaust gas temperatures. The same thing also applies to the type of screw connection. For example, fastening screws with cylindrical screw heads or the like are also conceivable here.

The invention claimed is:

1. A turbine housing of an exhaust gas turbocharger having an adjustable turbine geometry, comprising:
   a carrier ring on which adjustable guide vanes are mounted for regulating a boost pressure;
   a cover ring for the guide blades;
   spacer elements which maintain the carrier and cover rings a space apart to form a guide vane gap; and
   fastening screws passing through the spacer elements, said screws being screwed into at least one of the carrier ring and the cover ring,
   wherein
      receiving openings for each fastening screw head are provided in at least one of the carrier ring and cover ring,
      at least one securing recess is provided on an outside circumference of each receiving opening in the carrier or cover ring, said recess being provided to receive material of the screw head to establish a form-fitting connection.

2. The turbine housing of claim 1, wherein two securing recesses are arranged with a 180° offset to one another on the outside circumference of the receiving openings.

3. The turbine housing of claim 1, wherein the securing recesses are slots and are arranged on a common partial circle.

4. The turbine housing of claim 2, wherein the securing recesses are slots and are arranged on a common partial circle.

5. The turbine housing of claim 1, wherein the securing recesses are formed mechanically.

6. The turbine housing of claim 5, wherein the securing recesses are formed by a disk miller or an end mill cutter.

7. The turbine housing of claim 1, wherein the securing recesses are formed during casting of the carrier ring or the cover ring.

8. The turbine housing of claim 1, wherein the head of each fastening screw is a countersunk head, and each receiving opening is conically tapering to receive the countersunk head.

9. The turbine housing of claim 1, wherein material of the screw heads is introduced into the securing recesses.

10. The turbine housing of claim 9, wherein the screw head material is introduced into the securing recesses by staking with a staking tool.

11. The turbine housing of claim 1, wherein three receiving openings for the fastening screws are distributed around the circumference uniformly in at least one of the carrier ring and the cover ring.

* * * * *